(No Model.)
H. GULLIFORD.
SOD CUTTER.
No. 390,295. Patented Oct. 2, 1888.
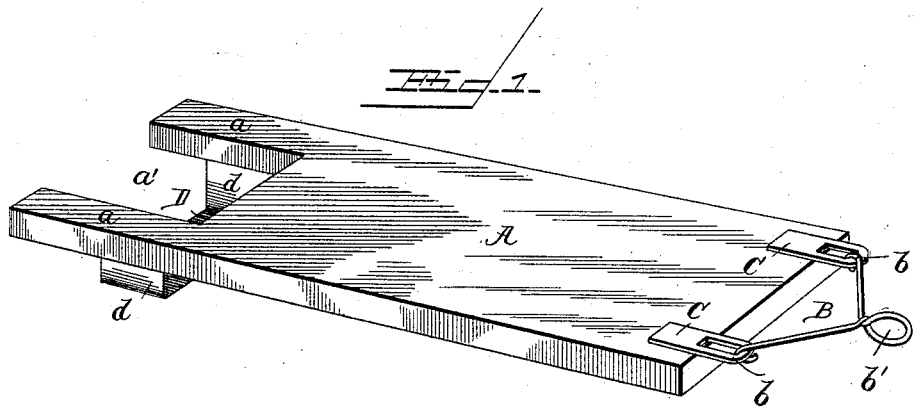
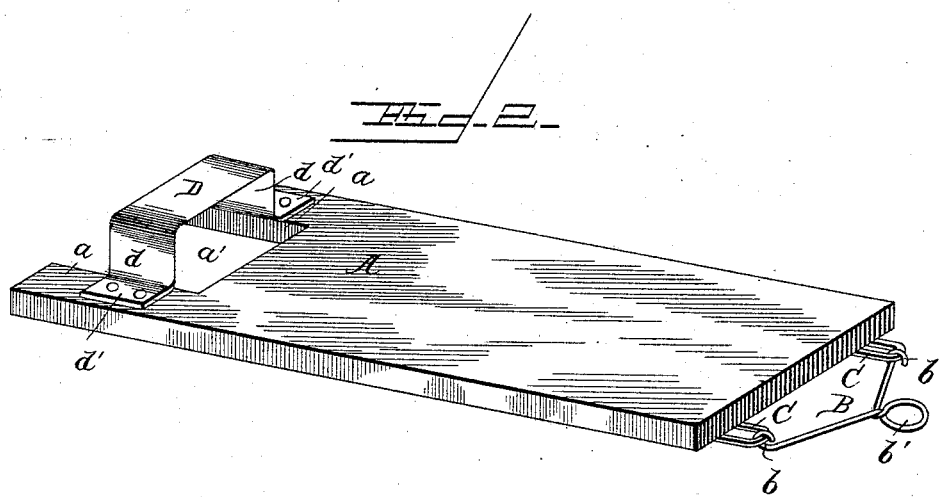
WITNESSES
Henry G. Dieterich
Theodore S. West
INVENTOR
Harvey Gulliford,
by C. A. Bowsley
Attorneys
N. PETERS, Photo-Lithographer, Washington, D. C.

UNITED STATES PATENT OFFICE.

HARVEY GULLIFORD, OF MARION, INDIANA.

SOD-CUTTER.

SPECIFICATION forming part of Letters Patent No. 390,295, dated October 2, 1888.

Application filed March 24, 1888. Serial No. 268,415. (No model.)

*To all whom it may concern:*

Be it known that I, HARVEY GULLIFORD, a citizen of the United States, residing at Marion, in the county of Grant and State of Indiana, have invented a new and useful Improvement in Sod-Cutters, of which the following is a specification.

The invention relates to improvements in sod-cutters, the object being to cut the sod with ease and rapidity; and it consists in the construction and novel combination of parts hereinafter described, illustrated in the accompanying drawings, and pointed out in the appended claims.

In the drawings, Figure 1 represents a perspective view of a sod-cutter embodying the invention. Fig. 2 represents a similar view of the same inverted, to more fully show the knife.

Referring to the accompanying drawings by letter, A designates the platform or carriage of the machine, of general rectangular form, a little wider than the sod to be cut and having the legs $a$ $a$ projecting from its rear to form the open space or recess $a'$.

B is a curved looped tongue, with its ends hooked into the openings in the brackets C, secured to the front upper surface of the platform at equal distances from the sides thereof. The hooks $b$ $b$ have their ends nearly closed, so that, while they can be detached by hand, they cannot be accidentally disengaged should the horse back on the machine. The central loop, $b'$, of the tongue acts as a clevis for the draft-gear, and the tongue itself is of elastic metal, so that it will give forward when starting, and not make the motion too abrupt, which might throw the driver down.

D is the sod-cutting knife, which has the transverse horizontal cutting portion $d$, of equal length to the open space $a'$, in the rear part of the platform, and the vertical arms rising therefrom on each side, and provided at their ends with the outstanding flanges $d'$ through openings in which the knife is bolted or otherwise secured to the lower side of the legs $a$.

In operation a draft-animal is attached to the tongue by the usual means, and the driver stands on the platform at a suitable point for his weight to cause the knife to enter the ground. The arms $d'$ should have a height about equal to the thickness of a sod, and if the knife should be injured another could be quickly substituted. The machine also packs the sod to a certain extent or compresses it slightly as it is cut immediately after the weight of the machine and man has passed over it. Of course the front edges of both the part $d$ and the arms $d'$ of the knife must be sharp, as the knife cuts both horizontally and vertically. The sod is cut in a long strip, which can be rolled up and carried home on the machine reversed. The lower front edge of the open space $a'$ is beveled to permit the sod to ascend easily.

Having described my invention, I claim—

1. The herein-described sod-cutter, composed of the long rectangular platform A, having the parallel arms $a$ extending from its rear end, with their outer edges prolonging the edges of the platform, arranged to be drawn by a horse and adapted to receive the driver and rest closely upon the ground, and the knife D, having a transverse part equal in length to the distance between the arms $a$, and vertical arms rising therefrom and secured to said arms, substantially as specified.

2. The combination of the long rectangular platform adapted to receive the driver and rest upon the ground, and provided with the parallel arms $a$ at its rear end, the knife D, having the arms $d$, secured to the said arms and flush with the inner edges thereof, the slotted brackets C, secured to the front end of the platform at equal distances from the sides thereof, and the elastic metal tongue B, having the hooks $b$ and the central clevis-loop, $b'$, substantially as specified.

In testimony that I claim the foregoing as my own I have hereto affixed my signature in presence of two witnesses.

HARVEY GULLIFORD.

Witnesses:
GEORGE H. MOON,
WILLIAM H. WILEY.